(12) United States Patent
Venkatesan et al.

(10) Patent No.: US 6,835,489 B2
(45) Date of Patent: Dec. 28, 2004

(54) DOUBLE LAYER OXYGEN ELECTRODE AND METHOD OF MAKING

(75) Inventors: Srinivasan Venkatesan, Southfield, MI (US); Hong Wang, Troy, MI (US); Boyko Aladjov, Rochester Hills, MI (US); Subhash Dhar, Bloomfield, MI (US); Stanford R. Ovshinsky, Bloomfield Hills, MI (US)

(73) Assignee: Texaco Ovonic Fuel Cell LLC, Rochester Hills, MI (US)

( * ) Notice: Subject to any disclaimer, the term of this patent is extended or adjusted under 35 U.S.C. 154(b) by 240 days.

(21) Appl. No.: 10/219,788

(22) Filed: Aug. 15, 2002

(65) Prior Publication Data

US 2004/0031678 A1 Feb. 19, 2004

(51) Int. Cl.[7] .............................................. H01M 4/86
(52) U.S. Cl. ............................. 429/40; 429/41; 429/42; 429/44; 204/290.1; 204/290.03; 204/290.04; 204/290.05; 204/290.06; 204/290.07; 204/294; 204/281; 204/284
(58) Field of Search ............................... 429/40, 41, 42, 429/44; 204/283, 284, 290.1, 290.03, 290.04, 290.05, 290.06, 290.07, 294

(56) References Cited

U.S. PATENT DOCUMENTS 4,586,999 A  *  5/1986  Goldsmith et al. ......... 204/265

* cited by examiner

Primary Examiner—Bruce F. Bell
(74) Attorney, Agent, or Firm—Frederick W. Mau, II; Marvin S. Siskind

(57) ABSTRACT

A double layered oxygen electrode impregnated with an active catalyst material and method of making. The design of the oxygen electrode promotes oxygen dissociation and absorption within the oxygen electrode. The oxygen electrode has differing layers of hydrophobicity which allow chemical impregnation of the active catalyst material into the oxygen electrode where the active catalyst material is needed most.

21 Claims, 5 Drawing Sheets

DOUBLE LAYER OXYGEN ELECTRODE AND METHOD OF MAKING

FIELD OF THE INVENTION

The present invention generally relates to oxygen electrodes utilized in a variety of fuel cells. More particularly, the present invention relates to oxygen electrodes chemically impregnated with varying catalysts.

BACKGROUND

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. application Ser. No. 09/444,810, entitled "A Hydrogen-based Ecosystem" filed on Nov. 22, 1999 for Ovshinsky, et al., which is herein incorporated by reference and U.S. patent application Ser. No. 09/435,497, entitled "High Storage Capacity Alloys Enabling a Hydrogen-based Ecosystem", filed on Nov. 6, 1999 for Ovshinsky et al., which is herein incorporated by reference), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds to the cost thereof. The proton exchange membrane itself is quite expensive, and because of its low conductivity, inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuel cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the PEM fuel cell, the active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between the hydrogen fuel and hydroxyl ions (OH⁻) present in the electrolyte, which react to form water and release electrons:

$$H_2 + 2OH^- \rightarrow 2H_2O + 2e^-.$$

At the oxygen electrode, the oxygen, water, and electrons react in the presence of the oxygen electrode catalyst to reduce the oxygen and form hydroxyl ions (OH⁻):

$$O_2 + 2H_2O + 4e^- \rightarrow 4OH^-.$$

The flow of electrons is utilized to provide electrical energy for a load externally connected to the hydrogen and oxygen electrodes.

In order that the oxygen reduction from air take place at a finite rate, it is necessary to incorporate some catalyst. In the Ovonic Regenerative fuel cells we have been using non-noble metal catalysts with great success. The so called oxygen reduction over-potential is significantly reduced by incorporation of such catalysts. Silver and cobalt based catalysts have been developed for this purpose. While silver catalysts work well the over-potential is about 50 mV higher than those based on the cobalt oxide based catalysts. Significantly, the use of cobalt oxide has enabled Ovonic fuel cells to utilize Stanford R. Ovshinsky's concept of Valency Change. This involves the use of oxygen from the air only for chemically reoxidizing the electrochemically reduced product and thus get away from the kinetically difficult oxygen reduction reaction. By the choice of the specific redox reaction combined with appropriate matrix material it is possible to produce electrodes operating at higher potential ranges.

The present invention discloses an oxygen electrode having a porous metal matrix with the required porosity and built-in hydrophobic character. The unique character of the oxygen electrode is helpful in maintaining the air diffusion layer where electrode flooding needs to be avoided. On the other side of the oxygen electrode, where the active catalyst is going to be incorporated, the lesser amount of hydrophobicity allows controlled penetration of aqueous liquids. The varying layers of hydrophobicity within the electrode allow controlled deposition of the catalyst contained within an aqueous solution onto the electrode. This controlled catalyst deposition allows the catalyst to be deposited in the oxygen electrode at desired locations. This is important because it allows the catalyst to be deposited where it is needed most on the oxygen electrode.

SUMMARY OF THE INVENTION

The object of the instant invention is a double layer oxygen electrode impregnated with active catalyst material. The layered structure of the oxygen electrode promotes oxygen dissociation and absorption within the oxygen electrode. The layered structure of the oxygen electrode also allows impregnation of the active catalyst material into the oxygen electrode where the active catalyst material is needed most.

The present invention discloses an oxygen electrode including a porous first layer having a built-in hydrophobic character, a porous second layer having a greater built-in hydrophobic character than the porous first layer, and two current collector grids. The porous first layer and the porous second layer are positioned adjacent to each other. The current collector grids are placed outside of the two layers forming a sandwich structure.

The porous first layer of the oxygen electrode is composed of a carbon matrix. The carbon matrix is composed of polytetrafluoroethylene coated carbon particles containing approximately 15–25% polytetrafluoroethylene by weight. The porous first layer of the oxygen electrode may also contain 0–30% by weight of a peroxide decomposer. The peroxide decomposer may be $MnO_2$, MnO, cobalt oxides, nickel oxides, iron oxides, and mixtures thereof. The porous first layer may also be impregnated with an active catalyst material. The active catalyst material may be deposited from $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transitive metal complexes, and mixtures thereof. After impregnation, the active catalyst material forms submicron to nano particles within said carbon matrix. The porous first layer may be impregnated with the catalyst via chemical or electrochemical impregnation with or without vacuum, chemical vapor deposition, plasma vapor deposition or other impregnation techniques.

The porous second layer of the oxygen electrode is also composed of a carbon matrix. The carbon matrix contains polytetrafluoroethylene coated carbon particles containing approximately 40–60% polytetrafluoroethylene by weight.

The current collector grids each comprise at least one selected from the group consisting of mesh, grid, matte, expanded metal, foil, foam and plate (with or without perforations).

The oxygen electrode of the present invention may be prepared by first preparing a first carbon matrix having a built-in hydrophobic character, preparing a second carbon matrix having a built-in hydrophobic character greater than said first carbon matrix; and layering the first carbon matrix and the second carbon matrix between a two current collector grids. After placing the two layers between the current collector grids, a pressure of 2 tons per 100 cm² is applied to the oxygen electrode followed by heat treating at 375 degrees Celsius for 15 to 30 minutes, followed by applying a pressure of 60 tons per 100 cm² to the oxygen electrode. Resulting is a porous oxygen electrode having differing layers of hydrophobicity.

Once formed, the oxygen electrode is impregnated with an active catalyst material. The active catalyst material is deposited into the oxygen electrode layer having the least hydrophobicity. The active catalyst material may be impregnated from $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Mn(NO_3)_2$ cyano complexes, organo-metallic complexes, amino complexes, citrate/tartrate/lactate/oxalate complexes, transition metal complexes, and mixtures thereof. The active catalyst material forms submicron to nano particles within the oxygen electrode.

The oxygen electrode is preferably impregnated with the active catalyst material using a chemical impregnation process. The chemical impregnation process includes the steps of first preparing an aqueous solution of active catalyst material, dipping the oxygen electrode into the aqueous solution of active catalyst material, simultaneously pulling the aqueous solution of active catalyst material into the oxygen electrode via vacuum, drying the oxygen electrode at room temperature, heat treating the oxygen electrode at 50 degrees Celsius to remove any water from the oxygen electrode; and heat treating the oxygen electrode at 300–375 degrees Celsius to remove and decompose the nitrates remaining inside the oxygen electrode. Alternatively, the oxygen electrode may be impregnated with the active catalyst material using a chemical vapor deposition impregnation process or plasma vapor deposition impregnation process.

DETAILED DESCRIPTION OF THE INVENTION

Figure 1:
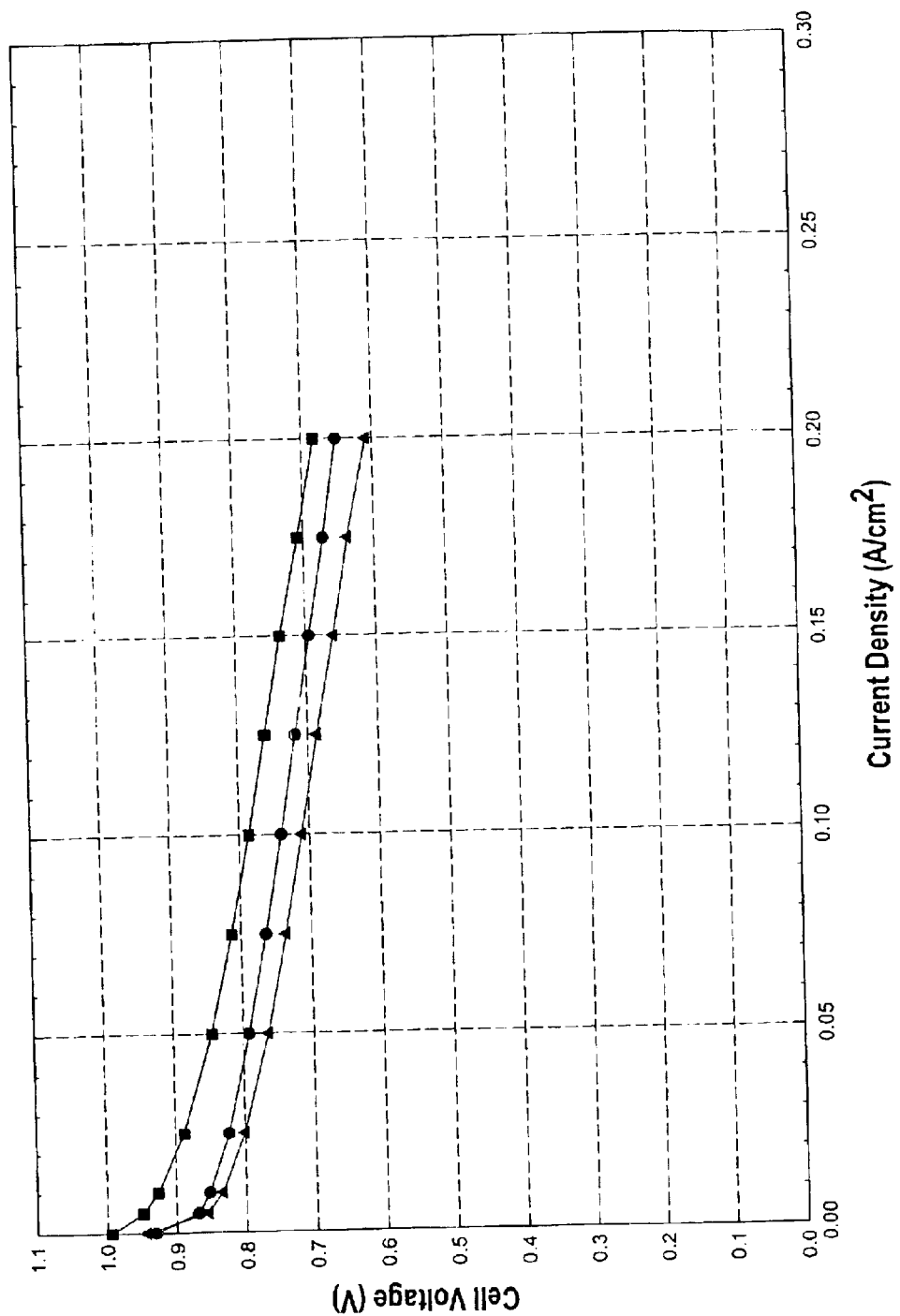
FIG. 1, shows the performance of the oxygen electrode in accordance with the present invention as compared to present day oxygen electrodes.

The present invention discloses double layer oxygen electrodes chemically impregnated with active catalyst materials. These electrodes are easily prepared and have excellent reproducibility. Due to the method of preparation of the oxygen electrodes, the degree of hydrophobicity within the electrodes is easily controlled. The method of preparation also allows impregnation of the catalyst into the electrode where the catalyst is most needed. With the catalyst being chemically impregnated into the oxygen electrode, the amount and type of catalyst can be controlled by a variety of variables including current density, temperature, and electrolyte concentration. Shown in FIG. 1, is the performance of an oxygen electrode in accordance with the present invention as compared to standard oxygen electrodes not having the characteristics described herein, wherein the electrodes utilize $Ag_2O$ as an active catalyst material. The oxygen electrode in accordance with the present invention has varying degrees of hydrophobicity within the fuel cell and is chemically impregnated with active catalyst material, whereas the standard oxygen electrodes have active catalyst material simply mixed with the electrode material and do not have varying degrees of hydrophobicity. The oxygen electrode in accordance with the present invention (■) shows improved performance over a standard oxygen electrode with Ag20(▲) and a teflonated oxygen electrode with Ag2O (●).

Figure 2:
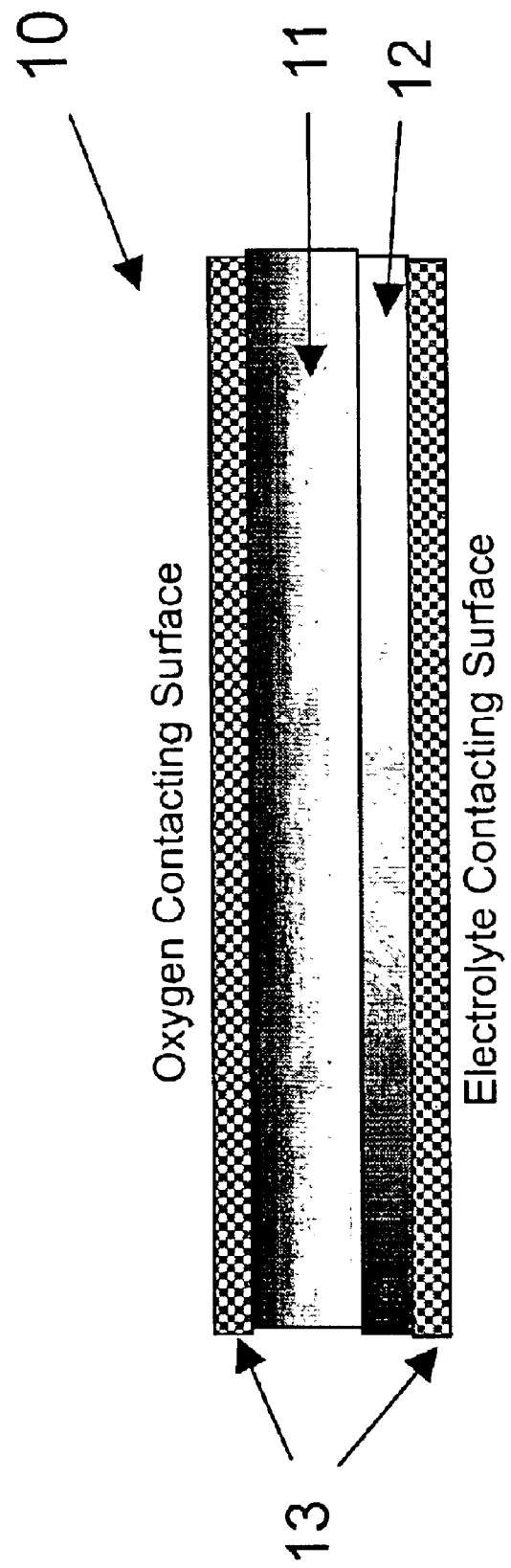
FIG. 2, shows a depiction of the oxygen electrode in accordance with the present invention.
Figure 3:
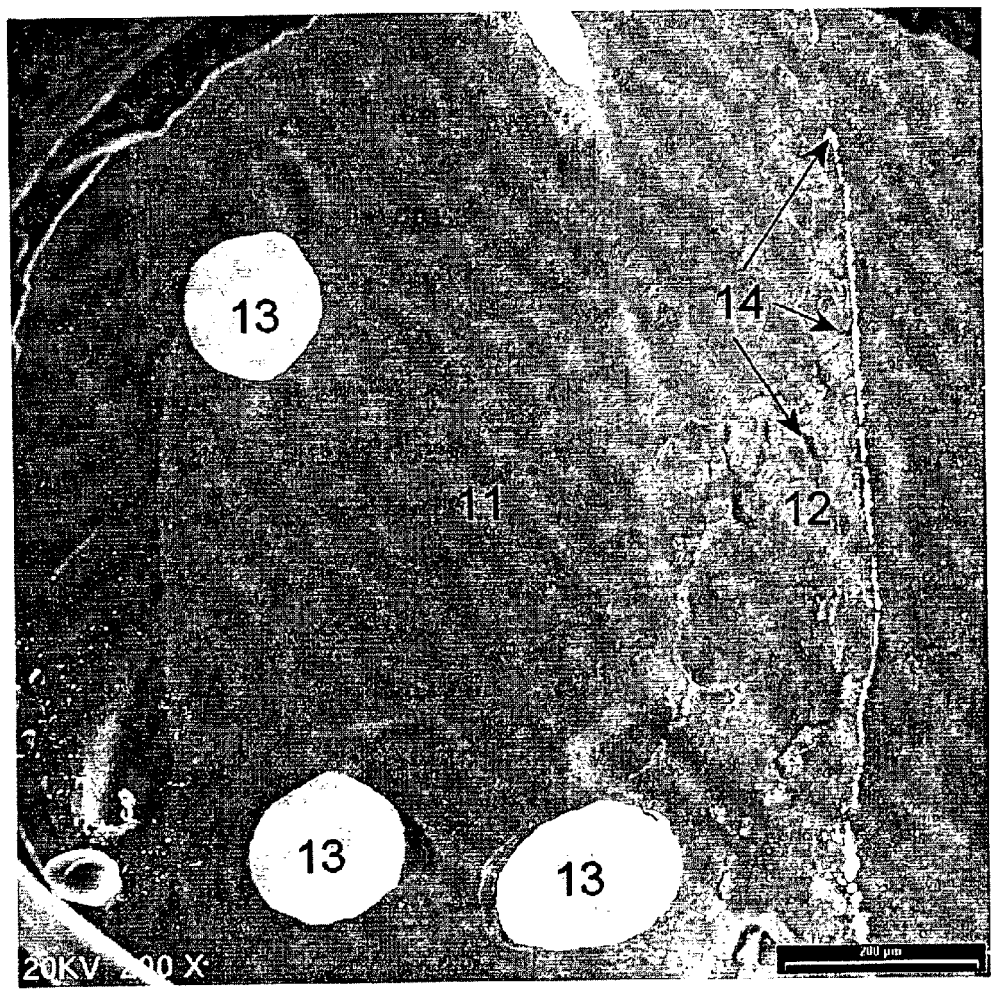
FIG. 3, shows a magnified image of the oxygen electrode in accordance with the present invention.

The double layer oxygen electrode 10 in the preferred embodiment of the present invention have a layered structure and are exemplified in FIG. 2. A magnified image of the double layer oxygen electrode 10 in accordance with the present invention is shown in FIG. 3. The layered structure promotes oxygen dissociation and absorption within the oxygen electrode. The double layer oxygen electrode 10 is composed of an A layer 11, a B layer 12, and two current collector grids 13. The A layer and the B layer are placed adjacent to one another with the current collector grids 13 being placed outside the A layer 11 and B layer 12 thereby forming a sandwich configuration. When used inside a fuel cell, the current collector grid in contact with the B layer 12 is in contact with the electrolyte solution while the current collector grid in contact with the A layer 11 is in contact with the air or oxygen stream.

The oxygen electrode needs a barrier means to isolate the electrolyte, or wet, side of the oxygen electrode from the gaseous, or dry, side of the oxygen electrode. A beneficial means of accomplishing this is by inclusion of a hydrophobic component comprising a halogenated organic polymer compound, particularly polytetrafluoroethylene (PTFE) within the electrode. With this in mind, the A layer 11 is primarily a carbon matrix composed of carbon particles coated with polytetrafluoroethylene. The carbon matrix is in intimate contact with a current collector grid which provides mechanical support to the carbon matrix. The carbon particles may be carbon black known as Vulcan XC-72 carbon (Trademark of Cabot Corp.), which is well known in the art. The A layer may contain approximately 40–60 percent by weight polytetrafluoroethylene with the remainder consisting of carbon particles.

The B layer 12 may be composed of a carbon matrix composed of polytetrafluoroethylene coated carbon particles and a peroxide decomposer with an active catalyst material 14 chemically impregnated within the carbon matrix. The carbon matrix is in intimate contact with a current collector grid which provides mechanical support to the carbon matrix. The carbon particles in the B layer may be carbon black known as Black Pearl 2000 (Trademark of Cabot Corp.). The carbon particles are coated with polytetrafluoroethylene wherein the teflonated carbon particles preferably contain approximately 20% polytetrafluoroethylene by weight. The amount of manganese dioxide may vary in the carbon matrix depending on design conditions. The carbon matrix may contain 0–30 weight percent of a peroxide decomposer. The peroxide decomposer may be MnO2, MnO, cobalt oxide, nickel oxide, iron oxide, or a mixture thereof. The peroxide decomposer is added to the carbon matrix to help improve stability of the oxygen electrode. Stability of the oxygen electrode is adversely affected by hydrogen peroxide formed as a byproduct of the reduction of oxygen. The peroxide decomposer eliminates the hydrogen peroxide thereby maintaining stability within the oxygen electrode. Preferably, MnO is used to promote better stability within the oxygen electrode as compared to $MnO_2$. The MnO reacts to form $MnO_2$ in a reversible oxidation reaction whereas the $MnO_2$ undergoes oxidation and remains at an even higher oxidation state.

Figure 4:
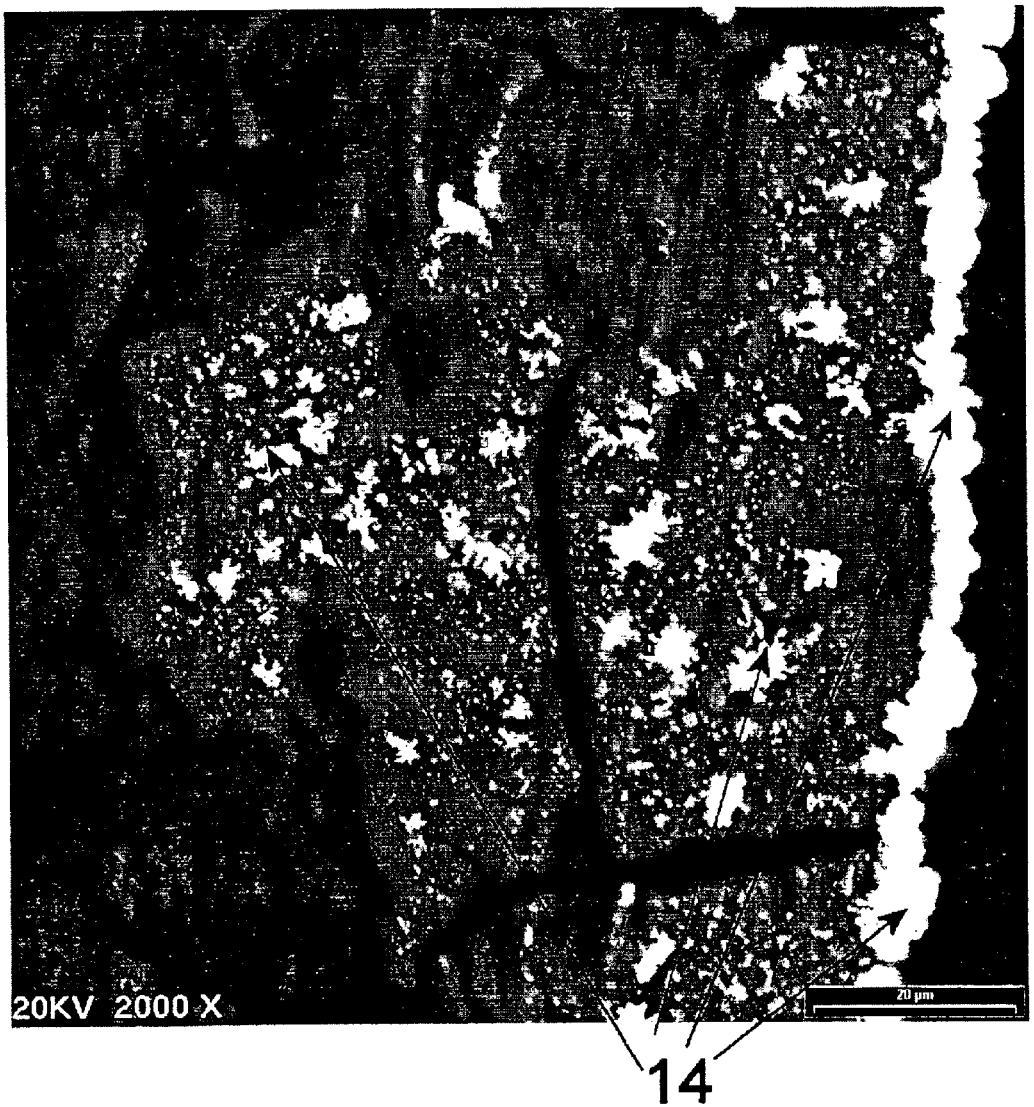
FIG. 4, shows a magnified image of the active catalyst material deposited inside the oxygen electrode of the present invention.
Figure 5:
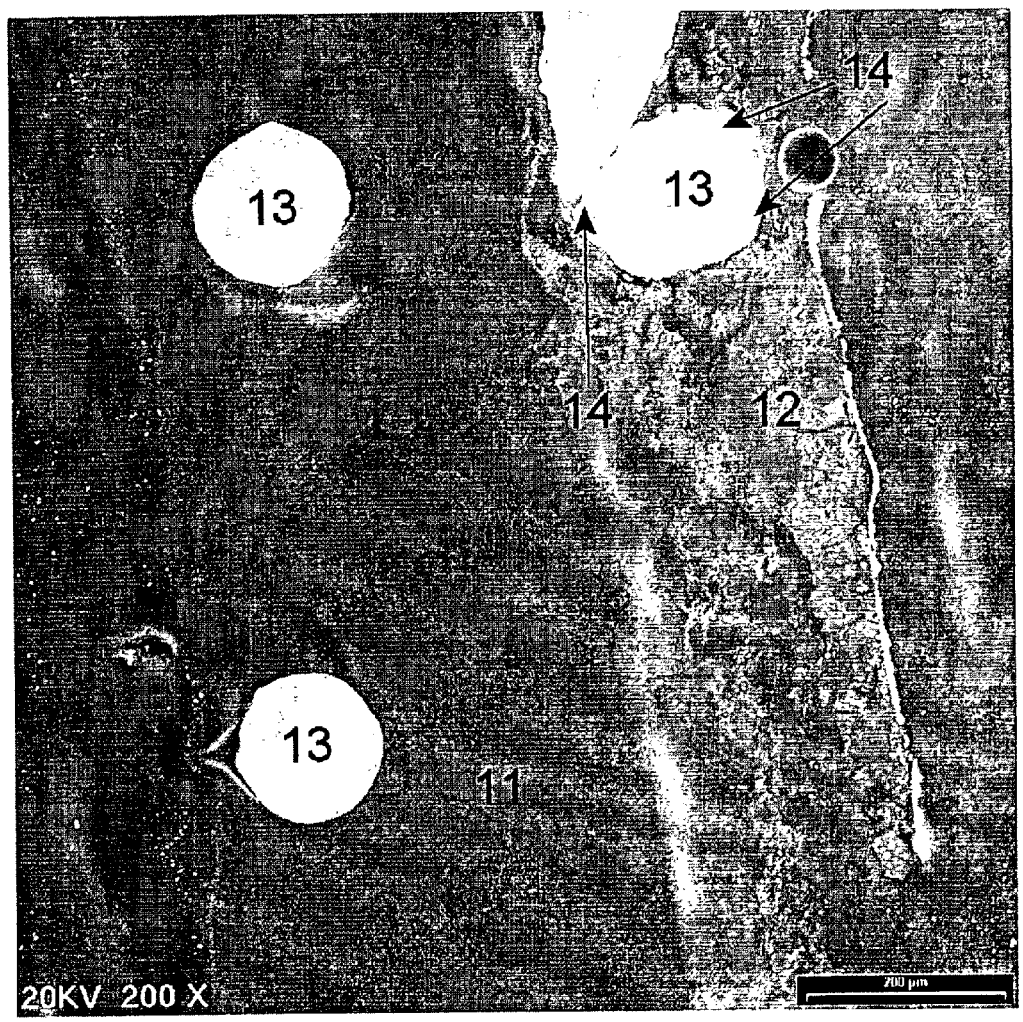
FIG. 5, shows a magnified image of the active catalyst material deposited around the current collector grid in the oxygen electrode of the present invention.

Once the carbon matrix is produced, the carbon matrix is chemically impregnated with a active catalyst material. The active catalyst material may be deposited from $AgNO_3$, a $AgNO_3/Ga(NO)_3$ mixture, $AgNO_3/LiNO_3$ mixture, $Co(NO_3)_2$, a cobalt amine complex, $NI(NO_3)_2$, $Mn(NO_3)_2$, cyano complexes, organo metallic complexes, amino complexes, citrate/tartrate/lactate/oxalate complexes, transition metal complexes, and mixtures thereof. Due to the higher hydrophobicity of the A layer 11 as compared to the B layer 12, the aqueous solution containing the active catalyst material penetrates only the B layer 12 thereby allowing deposition of the active catalyst material 14 only in the pores of the B layer 12. Upon deposition of the active catalyst material 14 within the B layer 12, the active catalyst material 14 forms submicron to nano particles within the pores of the B layer 12. An image of such particles is shown in FIG. 4. The active catalyst material may also aid in increasing the mechanical integrity of the oxygen electrode. The active catalyst material 14 may fill in voids where the carbon matrix contacts the current collector grid 13 thereby providing increased adhesion between the carbon matrix and the current collector grid 14. An image of the active catalyst material deposited around the current collector grid is shown in FIG. 5. The current collector grids in accordance with the present invention may be selected from, but not limited to, an electrically conductive mesh, grid, foam or expanded metal. The most preferable current collector grid is an electrically conductive mesh having 40 wires per inch horizontally and 20 wires per inch vertically, although other meshes may work equally well. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate. One current collector grid may be used in accordance with the present invention, however the use of two current collector grids is preferred thus increasing the mechanical integrity of the oxygen electrode.

The A layer of the oxygen electrode in accordance with the present invention is prepared by coating carbon particles with polytetrafluoroethylene (PTFE). The carbon particles are preferably carbon black known as Vulcan XC-72 carbon (Trademark of Cabot Corp.), which is well known in the art. The PTFE/carbon mixture contains approximately 40–60 percent PTFE by weight.

The B layer of the oxygen electrode in accordance with the present invention is prepared by first preparing a carbon matrix. The carbon matrix is composed of carbon particles coated with PTFE. The carbon particles are preferably carbon black particles known as Black Pearl 2000 (Trademark of Cabot Corp.), which is well known in the art. The carbon/PTFE black mixture contains approximately 20 percent PTFE with the remainder being carbon black particles. The carbon/PTFE is then mixed with a peroxide decomposer to form the carbon matrix. The carbon matrix may contain approximately 0–30 percent of a peroxide decomposer with the remainder being the carbon/PTFE mixture. The peroxide decomposer may be $MnO_2$, MnO, cobalt oxides, nickel oxides, iron oxides, or mixtures thereof.

The A layer is first deposited onto one of the current collector grids. Approximately 6–10 g of A layer material is deposited onto the current collector grid per 100 $cm^2$. The B layer is then deposited onto the A layer. Approximately 2–3 grams of B layer material is deposited onto the A layer per 100 $cm^2$. After depositing the A layer, the second current collector grid is placed on top of the B layer to complete the oxygen electrode. The oxygen electrode is pressed at a pressure of 2 tons per 100 $cm^2$. The electrode is subsequently heat treated at 375 degrees Celsius for 15–30 minutes. After heat treating, the oxygen electrode is again pressed at a pressure of 60 tons per 100 $cm^2$. After applying the 60 tons of pressure to the oxygen electrode, the oxygen electrode is ready for impregnation of the active catalyst material into the B layer.

To impregnate the B layer with the active catalyst material, the oxygen electrode is dipped into an aqueous solution of an active catalyst material precursor. The active catalyst material precursor may be $AgNO_3$, a $AgNO_3$/Ga$(NO)_3$ mixture, a $AgNO_3$/$LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transition metal complexes, and mixtures thereof. Instead of adding the peroxide decomposer to the carbon matrix in the B layer, the peroxide decomposer may be deposited from aqueous active material solution and co-impregnated with the active catalyst material into the oxygen electrode. Once submerged in the aqueous active catalyst material precursor solution, the solution may be pulled into the B layer under vacuum. The varying layers of hydrophobicity between the A layer and the B layer allow the solution to penetrate into the pores within the B layer and not penetrate into the A layer. The aqueous active catalyst material is thereby deposited in the pores within the B layer and any air or gases present in the solution pass through the A layer. After removing the oxygen electrode from the active catalyst material solution, the oxygen electrode is dried at room temperature. The oxygen electrode is then heat treated at 50 degrees Celsius to remove any water from the electrode. Remaining in the pores of the B layer are excess nitrate from the active catalyst precursor. The oxygen electrode is then heat treated at 300–375 degrees Celsius to decompose the remaining nitrates into oxides. An alternative to heat treating the oxygen electrode after depositing the active catalyst material solution in the pores of the B layer is to treat the oxygen electrode with NaOH and wash. To add more catalyst the above process is repeated as necessary. Depending on the choice of catalyst, the impregnation process may differ as a result of the carbon acting as a catalyst causing deposition of the active catalyst material. When using $AgNO_3$ as the active catalyst precursor, with carbon acting as a catalyst to reduce the $AgNO_3$ to Ag some of the steps may be omitted.

Alternatively, the carbon powder may be impregnated with the catalyst prior to being formed into the electrode layers. In such instances, the carbon powder is impregnated with the catalyst in the same manner as the electrodes. After impregnation with the catalyst, polytetrafluoroethylene is added to the catalyst impregnated carbon and the mixture is heat treated at 375 degrees Celsius. The catalyst impregnated teflonated carbon is then formed into the electrodes.

In addition to chemical or electrochemical impregnation, the carbon matrix or carbon particles may be impregnated using chemical vapor deposition and plasma vapor deposition techniques.

The foregoing is provided for purposes of explaining and disclosing preferred embodiments of the present invention. Modifications and adaptations to the described embodiments, particularly involving changes to the shape and design of the oxygen electrode, the type of active catalyst material, and the type of carbon used, will be apparent to those skilled in the art. These changes and others may be made without departing from the scope or spirit of the invention in the following claims.

What is claimed is:

1. An oxygen electrode comprising:
   a porous first layer having a built-in hydrophobic character including an active catalyst material deposited from a precursor selected from a group consisting of $AgNO_3$, a $AgNO_3$/Ga(NO)$_3$ mixture, a $AgNO_3$/$LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transition metal complexes, and mixtures thereof;
   a porous second layer disposed adjacent to said porous first layer having a greater built-in hydrophobic character than said porous first layer; and one or two current collector grids adapted to provide support to said porous first layer and said porous second layer.

2. The oxygen electrode according to claim 1, wherein said porous first layer comprises a plurality of polytetrafluoroethylene coated carbon particles containing 15 to 25% polytetrafluoroethylene by weight.

3. The oxygen electrode according to claim 1, wherein said porous first layer comprises up to 30% by weight of a peroxide decomposer.

4. The oxygen electrode according to claim 3, wherein said peroxide decomposer is selected from a group consisting of $MnO_2$, MnO, cobalt oxides, nickel oxides, iron oxides, and mixtures thereof.

5. The oxygen electrode according to claim 1, wherein said active catalyst material forms submicron to nano particles within said carbon matrix.

6. The oxygen electrode according to claim 1, wherein said porous second layer comprises a plurality of polytetrafluoroethylene coated carbon particles containing 40 to 60% polytetrafluoroethylene by weight.

7. The oxygen electrode according to claim 1, wherein said one or two current collector grids are selected from mesh, grid, matte, expanded metal, foil, foam or plate.

8. A method of preparing an oxygen electrode comprising the steps of:
(1) preparing a first carbon matrix having a built-in hydrophobic character;
(2) preparing a second carbon matrix having a built-in hydrophobic character greater than said first carbon matrix;
(3) affixing said first carbon matrix and said second carbon matrix to one or two current collector grids; and
(4) utilizing an impregnation process to impregnate said first carbon matrix with an active catalyst material deposited from a precursor selected from a group consisting of $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transition metal complexes, and mixtures thereof.

9. The method according to claim 8, wherein said active catalyst material forms submicron to nano particles within said first carbon matrix.

10. The method according to claim 8, wherein said impregnation process comprises the steps of:
(1) preparing an aqueous solution of said precursor;
(2) dipping said oxygen electrode into said aqueous solution;
(3) pulling said aqueous solution into said first carbon matrix via vacuum;
(4) drying said oxygen electrode at room temperature;
(5) heat treating said oxygen electrode at 50 degrees Celsius; and
(6) heat treating said oxygen electrode at 300–375 degrees Celsius.

11. The method according to claim 8, wherein said first carbon matrix comprises a plurality of polytetrafluoroethylene coated carbon particles containing 15 to 25% polytetrafluoroethylene by weight.

12. The method according to claim 8, wherein said carbon matrix comprises up to 30% by weight of a peroxide decomposer.

13. The method according to claim 12, wherein said peroxide decomposer is selected from a group consisting of $MnO_2$, MnO, cobalt oxides, nickel oxides, iron oxides, and mixtures thereof.

14. The method according to claim 8, wherein said second carbon matrix comprises a plurality of polytetrafluoroethylene coated carbon particles containing 40 to 60% polytetrafluoroethylene by weight.

15. The method according to claim 8, wherein said one or two current collector grids are selected from mesh, grid, matte, expanded metal, foil, foam or plate.

16. An oxygen electrode comprising:
a porous first layer having a built-in hydrophobic character;
a porous second layer disposed adjacent to said first layer having a greater built-in hydrophobic character than said porous first layer;
a first current collector grid disposed adjacent to said first layer opposite said second layer; and
a second current collector grid disposed adjacent to said second layer opposite said first layer.

17. The oxygen electrode according to claim 16, wherein said first carbon matrix comprises a plurality of polytetrafluoroethylene coated carbon particles containing 15 to 25% polytetrafluoroethylene by weight.

18. The oxygen electrode according to claim 16, wherein said second carbon matrix comprises a plurality of polytetrafluoroethylene coated carbon particles containing 40 to 60% polytetrafluoroethylene by weight.

19. The oxygen electrode according to claim 16, wherein said porous first layer comprises an active catalyst material deposited from a precursor selected from a group consisting of $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Nn(NO_3)_2$, cyano complexes, organo-metallic complexes, amino complexes, citrate/tartrate/lactate/oxalate complexes, transition metal complexes, and mixtures thereof.

20. The oxygen electrode according to claim 16, wherein said porous first layer comprises up to 30% by weight of a peroxide decomposer.

21. The oxygen electrode according to claim 20, wherein said peroxide decomposer is selected from a group consisting of $MnO_2$, MnO, cobalt oxides, nickel oxides, iron oxides, and mixtures thereof.

* * * * *